Dec. 16, 1924.
J. J. MICHALSKI
VEHICLE SIGNAL
Filed May 24, 1923
1,519,869
2 Sheets-Sheet 1
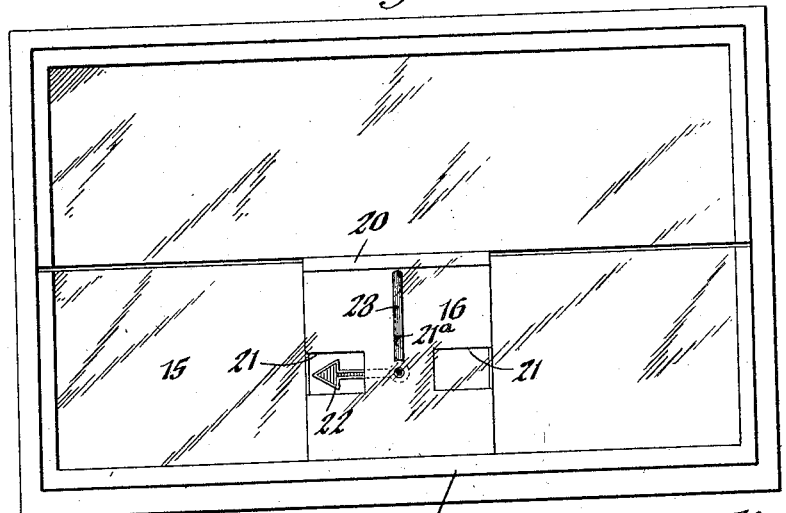
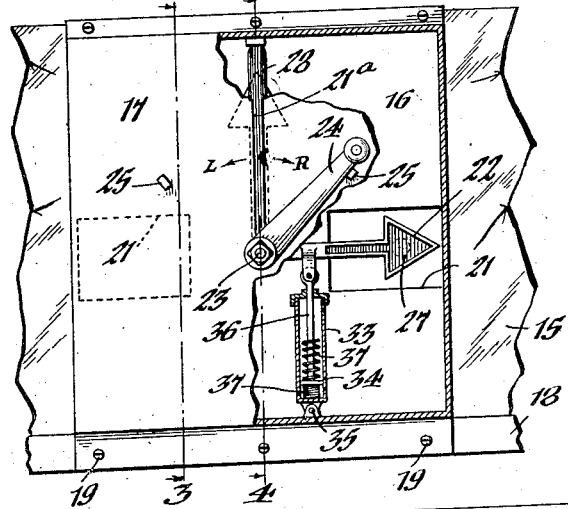
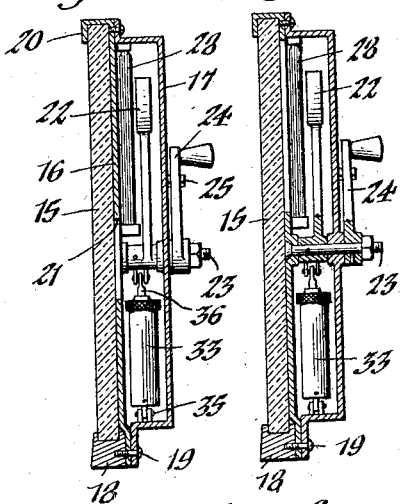
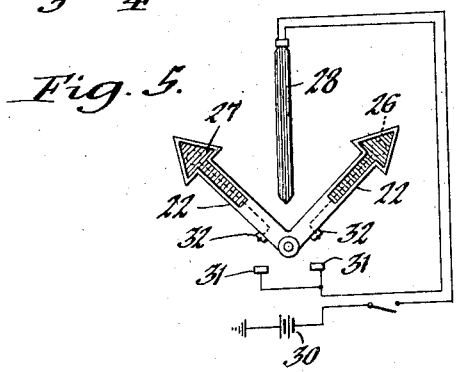
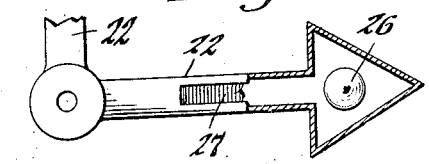
Inventor,
Joseph J. Michalski
by Geyer & Geyer.
Attorneys.

Dec. 16, 1924.  1,519,869
J. J. MICHALSKI
VEHICLE SIGNAL
Filed May 24, 1923   2 Sheets-Sheet 2
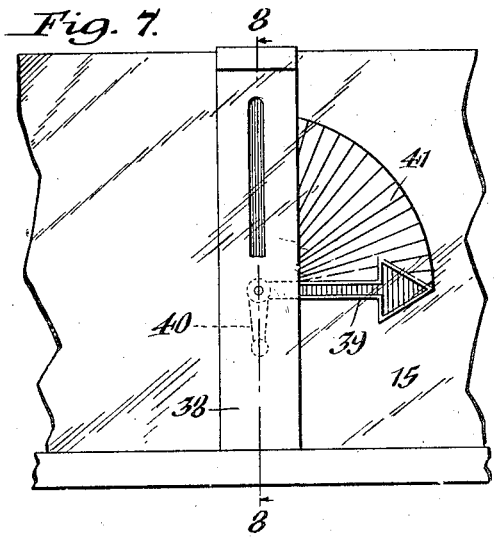
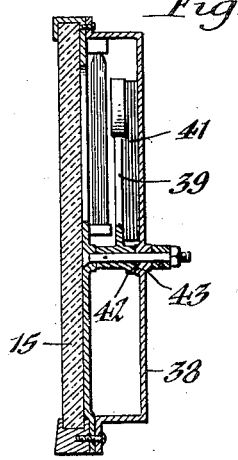
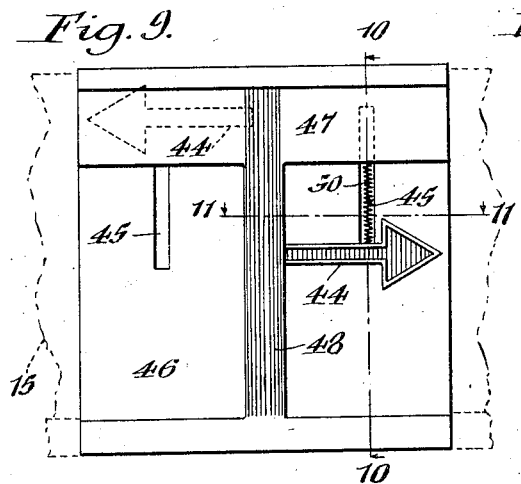
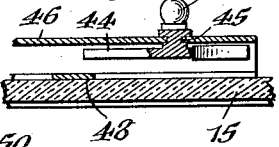
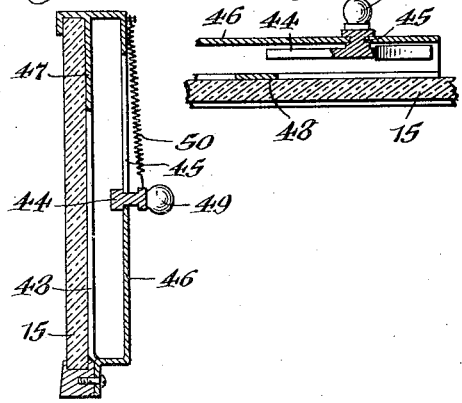
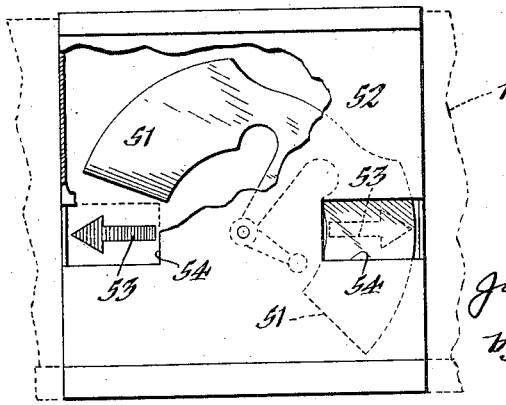
Inventor,
Joseph J. Michalski,
by Geyer & Geyer.
Attorneys.

Patented Dec. 16, 1924.

1,519,869

UNITED STATES PATENT OFFICE.

JOSEPH J. MICHALSKI, OF BUFFALO, NEW YORK.

VEHICLE SIGNAL.

Application filed May 24, 1923. Serial No. 641,180.

*To all whom it may concern:*

Be it known that I, JOSEPH J. MICHALSKI, a citizen of the United States, residing at Buffalo, in the county of Erie and State of New York, have invented new and useful Improvements in Vehicle Signals, of which the following is a specification.

This invention relates to improvements in signals and more particularly to vehicle signals for indicating to traffic officers, pedestrians and occupants of other cars, the intentions of the driver as to whether he will turn to the right or left.

Its principal object is to construct a signal of this character which is applicable to the windshield or other transparent part of the vehicle.

Another object of the invention is to provide a simple and inexpensive vehicle signal which is so constructed and organized that its indicating members are conspicuously displayed and clearly visible by day or by night.

In the accompanying drawings:

Figure 1 is a front view of the windshield of an automobile showing the improved signal applied thereto. Figure 2 is an enlarged sectional rear view thereof. Figures 3 and 4 are transverse vertical sections on the correspondingly numbered lines in Fig. 2. Figure 5 is a diagrammatic view of the indicating members and the electric circuit for controlling the lighting thereof. Figure 6 is an enlarged sectional elevation of one of the signal arms. Figure 7 is a front view of a modified form of the improvement. Figure 8 is a transverse vertical section thereof on line 8—8, Fig. 7. Figure 9 is a front view of another modified construction. Figure 10 is a transverse vertical section on line 10—10, Fig. 9. Figure 11 is a horizontal section on line 11—11, Fig. 9. Figure 12 is a sectional face view of another modification of the signal.

Similar characters of reference indicate corresponding parts throughout the several views.

In the drawings, the improved signal has been shown applied to the rear or inner side of the lower sash 15 of an automobile windshield, but it is to be understood that the invention is also applicable to any other transparent part of the vehicle where it is conspicuous and easily seen.

In the preferred embodiment of the invention shown in Figs. 1—6, inclusive, the operative parts thereof are mounted on a suitable upright supporting member or casing applied to the windshield and consisting of a front wall or panel 16 and a rear wall 17. The top, bottom and sides of this casing may or may not be closed. The lower end of the latter may be fastened to the frame portion 18 of the windshield by screws 19, while the upper end thereof may be fitted over the corresponding edge of the windshield sash 15 in the manner shown at 20 in Figs. 3 and 4. At its opposite sides and intermediate the upper and lower ends thereof, the front casing wall 16 is provided with substantially horizontal sight-openings or cut out portions 21, through which and the windshield the indicating members of the signal are visible when projected into their operative position.

The indicating members consist of a pair of arrow-shaped arms 22 mounted for vertically-swinging movement transversely of the vehicle on a rotatable shaft 23 journaled at its ends in the front and rear walls of the signal casing. These indicating arms move as a unit, one into and the other out of its operative position, and for this purpose they are disposed at an angle to each other, say for example, approximately 90°. An operating lever 24 is applied to the rear end of the shaft 23 whereby the driver may control the position of the respective signal arms from his seat. The movement of this lever, and likewise the signal arms, is preferably limited in either direction by suitable stops 25 arranged on the rear wall of the signal casing and in the path of movement of said lever. These stops are so located, that when the operating lever is turned to the right or left from its central or upright position, the corresponding signal arm is brought into proper register with the respective sight-opening 21 of the casing.

The outer portions of the signal arms 22 are hollow to receive an electric lamp 26 for illuminating the same at night and the front side thereof is provided with a colored lens 27, such as red. Disposed centrally of the front casing wall 16 and radiating from the axis of the signal-operating shaft 23 is a relatively narrow opening 21$^a$ through which an electric lamp 28 is visible, the latter being suitably supported on the interior of the casing and forming a suppdemental indicating means or vertical band for dividing the front wall of the casing into two fields into which the signal arms are projected. In the operative position of each signal arm, this band forms an angular continuation thereof and produces an effective display of the signal. This lamp may also be of a red color to correspond with that of the signal arm lens. The front wall of the signal casing and the front portions of the rear wall in line with the sight openings 21 are preferably painted white or some other color contrasting with the lamp 28 and signal arms 22, so that the latter stand out conspicuously when in their operative position.

The signal arm-lamps 26 and the lamp 28 are included in an electric circuit 29 deriving its current from a battery 30. Also included in this circuit are two switches for controlling the lighting of the lamps, each including a fixed contact 31 and a movable contact 32, the latter being carried by the respective signal arms 22. By this arrangement, when the operating lever 24 is turned in one direction or the other to display a given signal, the lamp of such signal arm, together with the lamp 28, is lighted the moment said arm reaches its operative position. In the normal position of the parts, shown in Fig. 5, the lamp circuit is open.

For the purpose of slowly and automatically returning the signal to its inoperative position upon releasing the operating lever 24, a vented cylinder or dash-pot 33 is employed in which a piston 34 operates. The lower end of the cylinder is pivoted to the signal-casing as shown at 35, while the free upper end of the piston rod 36 is pivoted to one of the signal arms 22, as shown in Fig. 2. Arranged within said cylinder on opposite sides of its piston are coil springs 37 which tend to effect the return of the respective signal arms to their inoperative concealed position. In this position of the signal, the piston is located midway between the ends of the cylinder and the springs are fully expanded, thus resisting movement of said signal out of such position.

In the modified form of the invention shown in Figs. 7 and 8, the signal supporting member or casing 38 is substantially the same as that of the previously described construction, with the exception that it is much narrower and eliminates the sight openings through which the signals are displayed. A single vertically-swinging signal arm 39 is mounted in this casing and operated by a handle 40. In its inoperative position, the signal arm stands upright behind the front wall of the casing, while in its operative position, the same projects horizontally to one side or the other of said casing, the opposite sides of the latter being open to permit of this movement. In order to form a contrasting background for the signal arm when in its indicating position, a collapsible fan-like sector 41 is employed which is fastened to said signal arm and to the rear wall of the casing. The front side of this sector may be white in color in contrast to the red signal arm.

To retain the signal arm 39 in its upright inoperative position, it is provided with a projection 42 adapted to interlock with a corresponding depression 43 in the adjacent side of the casing.

The modification shown in Figs. 9-11, inclusive, employs two independent vertically-shiftable signal arms 44 guided in ways 45 formed in the rear wall 46 of the signal casing. In their inoperative position, these arms are concealed from view behind a horizontal front shield 47 provided at the upper end of the casing, the remaining lower front portion of the latter being open with the exception of a central upright bar 48 which divides the casing into two fields into and out of which the signal arms are selectively movable. Each arm is provided at its rear side with an operating knob 49, a coil spring 50 being provided for restraining movement of said arm out of its inoperative position.

In the embodiment of the invention shown in Fig. 12, the construction is substantially the reverse of that shown in Figs. 1-6, inclusive. It consists of a pair of angularly disposed shutter-arms 51 fulcrumed for vertically-swinging movement within the casing 52 and arranged to cover and uncover the stationary signal devices 53 on opposite sides of the front face of the rear casing wall. The front wall is provided with the sight openings 54 through which the signals are displayed.

I claim as my invention:

1. A signal for a vehicle or the like, comprising a supporting member adapted for attachment to the windshield, a signal element mounted on said member and movable relatively thereto into and out of its signaling position, means for actuating said indicating element, and a stationary supplemental indicating element applied to said supporting member and forming on independent visible part of said movable signal element when the latter is in its operative position.

2. A signal for a vehicle or the like, comprising a supporting member adapted for attachment to the windshield, a signal element mounted on said member for movement relative thereto, the front portion of said member being constructed to conceal said signal element from view when in its inoperative position and to display it through the windshield when in its operative position, means for actuating said signal element, and a stationary supplemental indicating element applied to the concealing front portion of said supporting member and forming an independent visible part of said movable signal element when the latter is in its operative position.

3. A signal for a vehicle-windshield or the like, comprising a casing adapted for attachment to one side of the windshield, the front wall of said casing being adjacent to the windshield and having a sight opening therein, an indicating arm arranged within said casing and movable into and out of register with said opening, means for retaining the indicating arm in its inoperative position, and means for actuating said arm.

4. A signal for a vehicle-windshield or the like, comprising a casing adapted for attachment to one side of the windshield, the front wall of said casing adjacent to the windshield having a sight opening therein, an indicating arm arranged within said casing and movable into and out of register with said opening, means for actuating said indicating arm to move it to signaling position, and unitary means for retaining the latter in its inoperative position and for returning the same to such position upon releasing said actuating means.

5. A signal for a vehicle-windshield or the like, comprising a casing adapted for attachment to one side of the windshield, the front wall of said casing adjacent to the windshield having sight openings at opposite sides thereof, a pair of vertically swinging signal arms arranged within said casing and movable as a unit into and out of register with the respective sight openings, only one of said arms being displayed at any one time, and means for actuating said signal arms.

6. A signal for a vehicle-windshield or the like, comprising a casing adapted for attachment to one side of the windshield, the front wall of said casing adjacent to the windshield having sight openings at opposite sides thereof, a pair of signal arms arranged within said casing and movable as a unit into and out of register with the respective sight openings, only one of said arms being displayed at any one time, means for actuating said signal arms, a cylinder arranged in said casing and having a piston movable therein connected to one of said signal arms, and springs in said cylinder located on opposite sides of the piston for returning the signal arms to their inoperative position.

7. A vehicle signal, comprising a supporting member, a signal element mounted on said member and movable relatively thereto into and out of its operative position, and supplemental indicating means applied to the supporting member and forming an angular continuation of said signal element when in its operative position, the latter and said supplemental indicating means being of the same characteristic nature.

JOSEPH J. MICHALSKI.